(12) United States Patent
Jordan (10) Patent No.: US 10,252,895 B2
(45) Date of Patent: *Apr. 9, 2019

(54) SOLAR ARRAY LIFTER AND METHOD (71) Applicant: Travis Jordan, Ronan, MT (US)

(72) Inventor: Travis Jordan, Ronan, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,272

(22) Filed: Sep. 19, 2017

(65) Prior Publication Data

US 2018/0002147 A1 Jan. 4, 2018

Related U.S. Application Data

(62) Division of application No. 14/262,507, filed on Apr. 25, 2014, now Pat. No. 9,790,065.

(60) Provisional application No. 61/816,032, filed on Apr. 25, 2013.

(51) Int. Cl.
*B66D 3/04* (2006.01)
*F24S 25/12* (2018.01)
*F24S 25/00* (2018.01)

(52) U.S. Cl.
CPC .............. *B66D 3/04* (2013.01); *F24S 25/12* (2018.05); *F24S 2025/01* (2018.05); *F24S 2025/014* (2018.05); *Y02E 10/47* (2013.01)

(58) Field of Classification Search
CPC .... B66D 3/04; F24J 2/5232; F24J 2002/5273; F24J 2002/5281; Y02E 10/47
See application file for complete search history.

(56) References Cited

U.S. PATENT DOCUMENTS

| | | | | |
|---|---|---|---|---|
| 3,924,751 A * | 12/1975 | Ballenger | ................ | B62H 3/12 211/117 |
| 3,976,283 A * | 8/1976 | Schmit | .................... | B66D 1/04 116/173 |
| 5,199,843 A * | 4/1993 | Sferra | ...................... | B66F 7/02 414/286 |
| 5,897,104 A * | 4/1999 | Garbiso | .................... | B66C 1/18 248/327 |
| 6,161,702 A * | 12/2000 | Campbell | ................ | B62H 3/12 211/1.57 |
| 7,150,449 B1 * | 12/2006 | Dueck | ...................... | B62H 3/12 254/278 |
| 7,530,325 B2 * | 5/2009 | Swenson | ................. | E04H 12/32 116/173 |
| 8,033,529 B2 * | 10/2011 | Boda | ........................ | B62H 3/12 254/372 |
| 8,109,225 B2 * | 2/2012 | McCudden | ............. | E04H 12/32 116/173 |
| 8,130,168 B1 * | 3/2012 | Sergi | .................... | H01Q 1/1242 343/878 |
| 8,258,394 B2 * | 9/2012 | Baruh | ..................... | B63H 9/04 136/245 |
| 8,944,413 B1 * | 2/2015 | Hatch | ...................... | B63C 3/06 254/323 |

(Continued)

*Primary Examiner* — Michael E Gallion
(74) *Attorney, Agent, or Firm* — Scott D. Swanson; Shaver & Swanson, LLP (57) ABSTRACT

A solar array lifting assembly and method. The device and method use a support pole, a pole bracket for supporting a solar array made up of a frame and solar panels, a pole bracket securing mechanism for securing the pole bracket at a predetermined height, and a lifting assembly for lifting the pole bracket and solar array along the support pole.

5 Claims, 6 Drawing Sheets

(56) References Cited

U.S. PATENT DOCUMENTS

| | | | | |
|---|---|---|---|---|
| 9,790,065 B2* | 10/2017 | Jordan | ................... | B66D 3/04 |
| 2002/0149536 A1* | 10/2002 | Safakhah | ............. | H01Q 1/1207 |
| | | | | 343/882 |
| 2009/0090895 A1* | 4/2009 | Hogan, Jr. | ............. | A01G 9/022 |
| | | | | 254/266 |
| 2010/0170188 A1* | 7/2010 | Zilmer | ................... | B66C 23/18 |
| | | | | 52/745.17 |
| 2010/0237305 A1* | 9/2010 | Miller | ................... | B66F 7/02 |
| | | | | 254/358 |
| 2010/0314509 A1* | 12/2010 | Conger | ................. | F24J 2/5241 |
| | | | | 248/121 |
| 2011/0181018 A1* | 7/2011 | Bruneau | ................. | B60P 3/10 |
| | | | | 280/414.1 |
| 2011/0271608 A1* | 11/2011 | Egan | ..................... | E04H 12/10 |
| | | | | 52/122.1 |
| 2012/0152877 A1* | 6/2012 | Tadayon | ................... | B25J 5/02 |
| | | | | 212/224 |
| 2012/0181494 A1* | 7/2012 | Guyard | .................... | B66F 3/00 |
| | | | | 254/385 |
| 2012/0227788 A1* | 9/2012 | Lundahl | .................. | F24J 2/523 |
| | | | | 136/246 |
| 2012/0321416 A1* | 12/2012 | Nobles | ..................... | B66C 1/18 |
| | | | | 414/23 |
| 2013/0126809 A1* | 5/2013 | Britten | ...................... | G09F 7/18 |
| | | | | 254/385 |
| 2014/0096802 A1* | 4/2014 | Volin | .................. | A45B 25/143 |
| | | | | 135/16 |
| 2014/0319439 A1* | 10/2014 | Jordan | .................... | B66D 3/04 |
| | | | | 254/334 |
| 2015/0372636 A1* | 12/2015 | Menard | ................. | F24J 2/5232 |
| | | | | 136/246 |
| 2018/0002147 A1* | 1/2018 | Jordan | ................... | F24J 2/5232 |

* cited by examiner

SOLAR ARRAY LIFTER AND METHOD

REFERENCE TO RELATED APPLICATIONS

This application is a divisional of U.S. patent application Ser. No. 14/262,507 which claims priority to U.S. Provisional Patent Application No. 61/816,032.

BACKGROUND

As the world population grows the demand for energy continues to increase. One of the current primary sources of energy is the burning of fossil fuels, such as coal, oil, and natural gas. This increase in demand necessitates additional sources of energy be utilized as the supply of fossil fuels fails to keep up. Current power generation methods using fossil fuels contribute to the emission of green house gases as well as other pollutants. In remote areas the transportation of fossil fuels or construction of power lines to a location can be difficult, dangerous and economically unfeasible.

One area of interest is the use of photovoltaic cells that generate electricity directly from sun light. The solar power systems utilize large flat panels that when exposed to sun light will generate electricity. These systems require large heavy arrays of solar panels in order to generate a significant amount of electricity. The weight and size of these arrays make it difficult to install the panels without the use of a crane or other heavy equipment.

Additionally, many applications for solar electricity are available because of the remote area of the installation. In remote locations, the use of heavy equipment may be difficult or impossible. If heavy equipment is not used, the installer must install the panels to a frame already high above the ground, requiring the use of a ladder that the installer has to carry the panels up in order to install. This installation procedure can be difficult and result in injury to the installer, damage to the solar array or damage to other nearby property.

In order to further facilitate the use of solar energy, it is necessary to improve the ability to quickly, safely and inexpensively install the solar panels. The use of a crane can be expensive as well as requiring significant space in which the crane can operate. These cranes require specialized training in order to operate as well as increased initial costs and maintenance. Alternatively, an installer can rent the heavy equipment but this leads to higher installation costs. Additionally, the crane requires sufficient room in order to lift the solar array and swing it over the position designated for the solar array and then lower the solar array back down onto the supports.

It would be advantageous to improve the installation of the solar array panels in order to reduce the cost of installation as well as improve limitations currently requiring the use a crane, heavy equipment or electricity.

SUMMARY

Disclosed is a solar array lifting assembly. The solar array assembly includes a support pole which is mounted vertically in the ground and is capable of supporting a pole bracket and a solar array that includes a frame and solar panels. The pole bracket is placed on the support pole near ground level so that the bracket can slide up and down on the support pole but cannot be moved horizontally.

Attached to the pole bracket is a frame. This frame attaches to the pole bracket and extends outward to allow for the attachment of one or more solar panels. The pole bracket preferably includes a pole bracket securing mechanism which allows the pole bracket to be secured to the support pole at a predetermined fixed height such as at the top of the support pole. The pole bracket securing mechanism can be a bolt that passes through the pole bracket and over the top of the support pole, or it can be other forms, such as a ratcheting roller within the pole bracket or a retracting support attached to the support pole. The frame can be assembled as well as the solar panels attached to the frame at ground level, with the pole bracket positioned near the ground level. Further included is the lifting assembly for lifting the solar array from ground level to the predetermined height on the support pole. The lifting assembly includes a lifting bracket which is placed on top of the support pole and extends vertically and horizontally away from the pole. The lifting bracket design allows for attachment of a lifting mechanism, such as a pulley, outside the diameter of the support pole. The lifting mechanism can have multiple designs, such as a chain fall hoist or a pulley, attached to the end of the lifting bracket.

A lift connector, such as chains or a cable, is attached to the lifting mechanism and to the pole bracket. In the case of a cable attached to a winch or vehicle to apply the force, the first end of the cable is attached to the pole bracket and the second end routed over a pulley, functioning as the lifting mechanism, and is attached to a winch capable of applying enough tension to the cable to lift the solar array into position. For purposes of discussion, a part described as a cable can mean a metal cable, a chain, a rope, or other flexible cord like materials. Multiple techniques can be used for the lifting assembly, such as a winch mounted to the pole, a mechanical gear hand crank winch, or an electric winch or a hi-gear ratio pulley can be used at the top with hand force to move the cable. Additionally, the pole bracket securing mechanism of the pole bracket can be multiple systems such as a simple bolt passing through the pole bracket and over the support pole.

Further disclosed is a method for lifting a solar array which includes the steps of mounting a support pole in the ground, the next step is placing a lifting bracket on top of the support pole with a pulley attached to the lifting bracket. The next step is attaching a cable end to the pole bracket, which slides on the pole, and attaching the second end of the cable to a tensioning device. The next step is routing the cable through the pulley and applying a tension force to the second end of the cable. This tension force must be sufficient to raise the solar array. Next, you must continue to apply tension to the cable until the array reaches a desirable height. The next step is the user secures the array at the desired height with a pole bracket securing mechanism. For this method the pulley can include gears to give the user the mechanical advantage. The steps can include using a retractable latch set in the pole at a desired height for a tie-down cleat or a ratcheting within the pole sleeve. The steps can include the use of multiple types of tensioning devices such as a manual or powered crank attached to the bottom of the pole or a winch mounted to the top of the pole and controlled by remote control.

DETAILED DESCRIPTION

As shown in FIGS. 1-11, the solar array lifting assembly 10 includes at least one support pole 14 which is secured in the ground and directed into a vertical position. Support pole 14 can be in many shapes such as round, oval or square but a circular metal pole is preferred. A typical installation would use a support pole of tubular steel, 8" in diameter and 15' in height. Support pole 14 must be capable of supporting a heavy solar array that is secured at the top of the pole.

Figure 1:
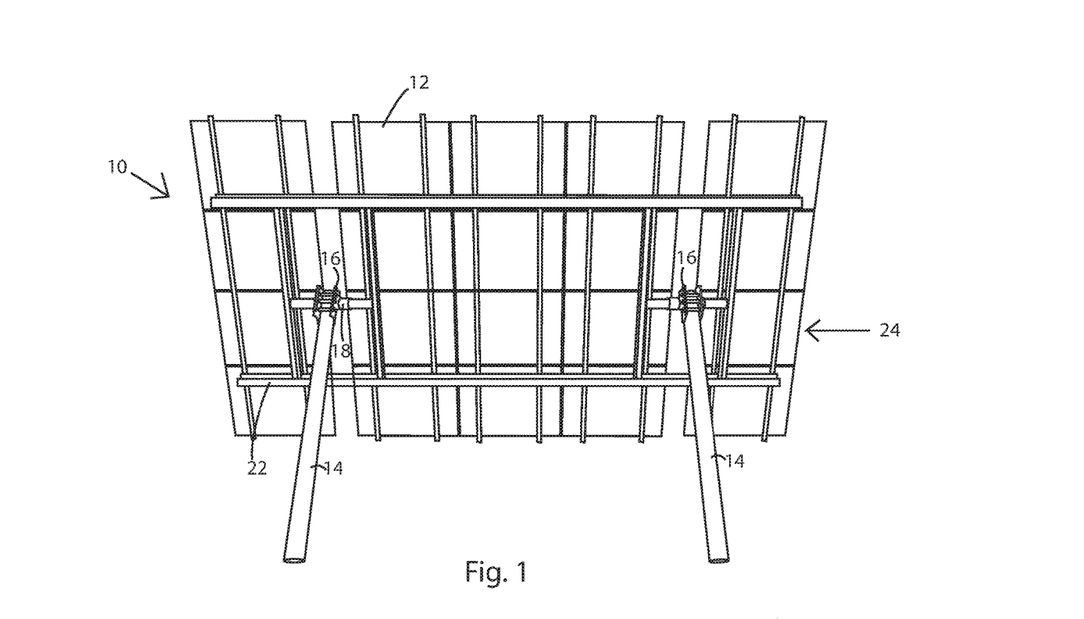
FIG. 1 is a perspective view showing the underside of an installed solar array in accordance with one embodiment of the inventive concepts.

FIG. 1 shows the use of multiple support poles 14 in order to facilitate larger solar arrays 24. Each solar array 24 is made up of frame 22 and solar panels 12. A typical solar array might be 8'×10'. The solar array 24 is created by attaching frame 22 to pole bracket 16, which is attached to support pole 14, and then attaching solar panels 12 to the frame 22, creating a large flat surface of solar panels 12. The creation of the solar array 24 is performed near ground level. FIG. 1 shows the solar array 24 after being lifted to the top of support poles 14.

Figure 2:
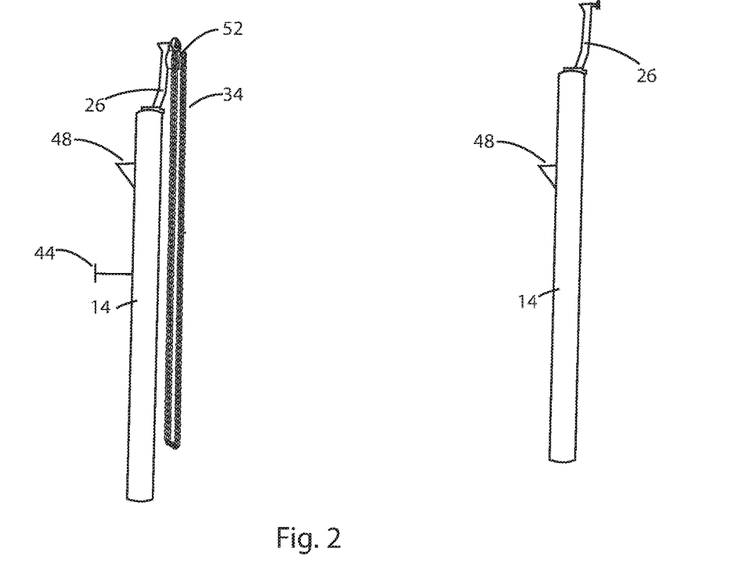
FIG. 2 is a perspective view of the support poles, lifting bracket, and one pulley in accordance with an embodiment of the inventive concepts.

FIG. 2 shows two support poles 14 having been placed in the ground. On top of each pole is lifting bracket 26 which is placed at the top of the pole and is capable of accepting lifting mechanism 52. Lifting mechanism 52 utilizes lift cable 34 to transfer force from lifting mechanism 52 to pole bracket 16. FIG. 2 shows lifting mechanism 52 as a chain fall hoist. In the use of a chain fall hoist, lift cable 34 is a chain. While a chain fall hoist is shown, other lifting mechanisms such as pulleys, winches or similar devices are acceptable. Lifting mechanism 52 can be of various designs, such as a pulley. A 1 or 2 ton chain fall hoist is suitable for some installations.

FIG. 2 further shows alternative devices for securing the solar array at a desired height. In one embodiment once the solar array reaches the desired height the lift cable 34 is secured to tie-down cleat 44. FIG. 2 further shows the use of a retractable support 48 installed on the support pole 14. Retractable support 48 is capable of retracting into support pole 14. This retraction allows pole bracket 16 to slide over retractable support 48 when pole bracket 16 is being raised. Once pole bracket 16 passes over retractable support 48, retractable lock 48 extends outward to create a support for pole bracket 16.

Figure 3:
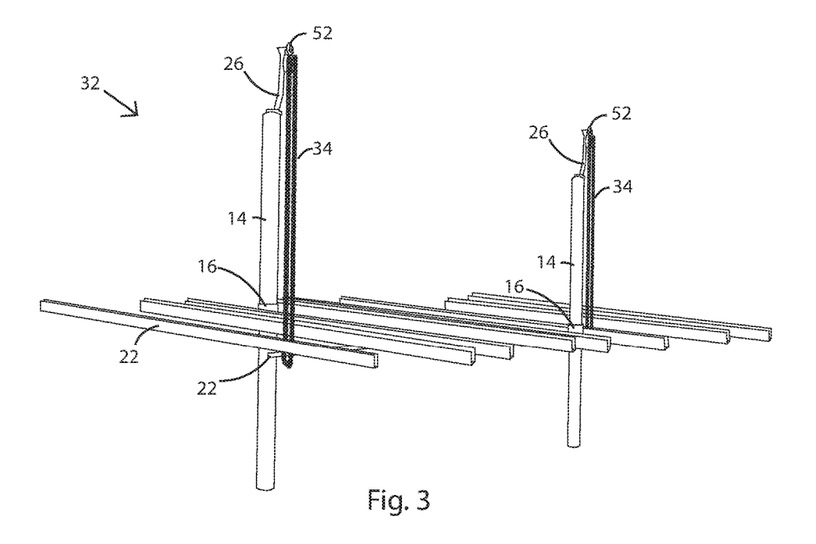
FIG. 3 is a perspective view of the support poles, frame, and lifting mechanism in accordance with an embodiment of the inventive concepts.

FIG. 3 shows the lifting assembly 32. Lifting assembly 32 is made of lifting bracket 26, which is placed on support pole 14, a lifting mechanism 52, and a lifting cable 34 attached between lifting bracket 26 and pole bracket 16. In FIG. 3 lifting cable 34 consists of chains attached to the lifting mechanism 52 and connected to the pole bracket 16. Frame 22 is attached to the pole bracket 16. Frame 22 is capable of accepting solar panels attached to the surface using nuts, bolts and other attachment mechanisms. In this configuration lifting assembly 32 is capable of applying sufficient force to raise the solar array to a predetermined position, such as the top of the support pole 14.

Figure 4:
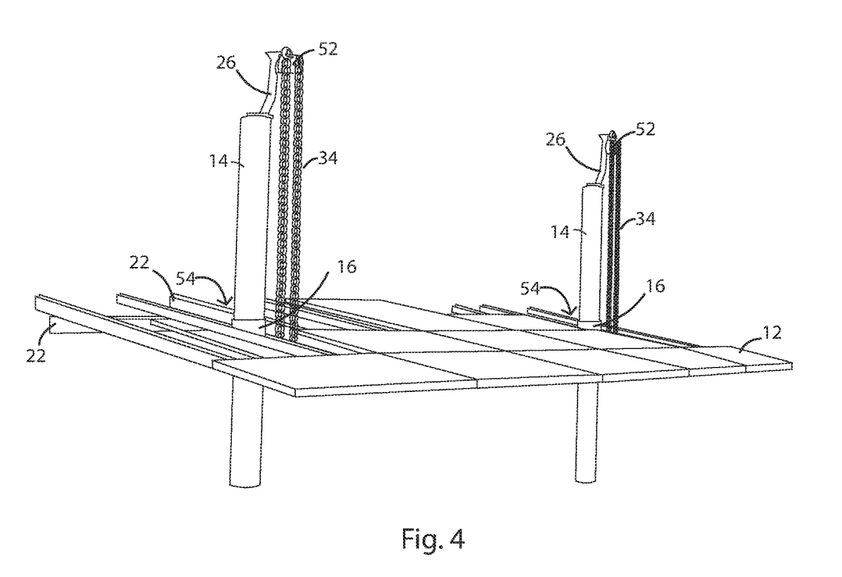
FIG. 4 is a perspective view of the support poles, frame, lifting mechanisms, with the solar panels partially installed in accordance with an embodiment of the inventive concepts.

FIG. 4 shows solar panels 12 partially installed on frame 22. The solar panels in FIG. 4 are installed so that there is a separation space 54 allowing for passage of support pole 14 as well as the chain 34. Once the solar array has been lifted to the top of support pole 14, the pole bracket is secured and the lifting mechanisms are removed, the separation space 54 can be covered by sliding solar panels into place, installing additional solar panels into separation space 54, or the separation space 54 can be left open.

Figure 5:
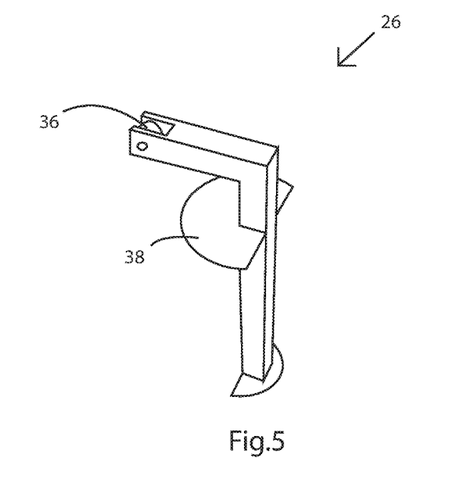
FIG. 5 is a perspective view of a lifting bracket in accordance with an embodiment of the inventive concepts.

FIG. 5 shows lifting bracket 26 with a simple pulley mounted on lifting bracket 26. Lifting bracket 26 is configured to extend outwardly beyond the outside diameter of support pole 14 and to extend into the interior of support pole 14. In this way a rope, cable, chains or other similar device can pass vertically down to the pole bracket mounted on a vertical pole and pull the pole bracket vertically without being interfered with by support pole 14. Lifting bracket 26 further includes bracket support 38 which is capable of supporting the bracket during lifting operations, but allows a bolt to pass through the pole bracket and across the top of the support pole 14. In the embodiment shown, lifting bracket 26 extends downwardly into the interior of the support pole 14.

Figure 6:
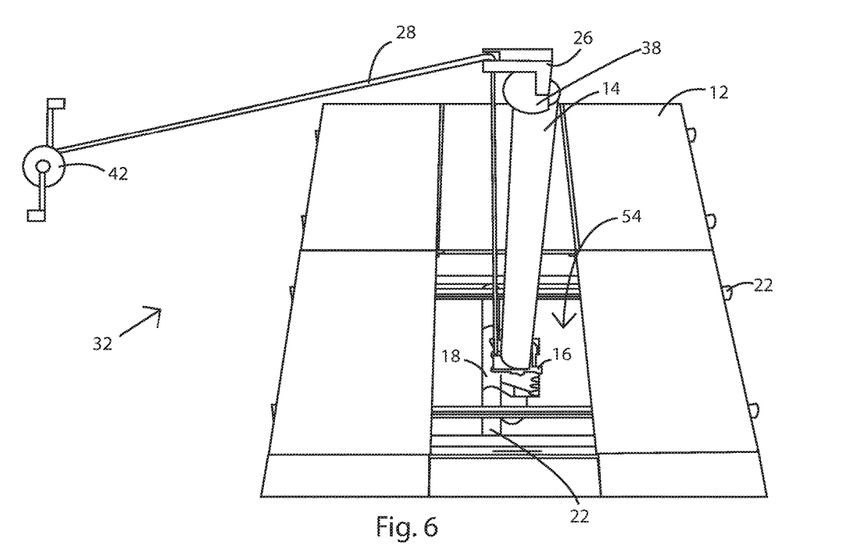
FIG. 6 is a top view of a solar array being lifted in accordance with an embodiment of the inventive concepts.
Figure 7:
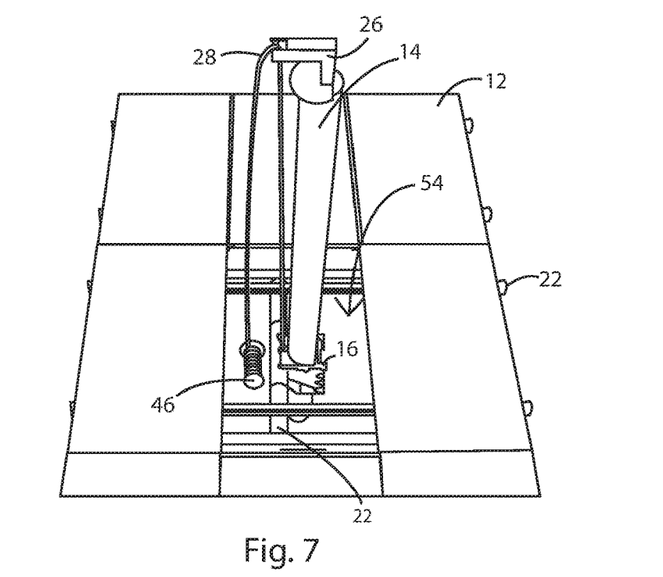
FIG. 7 is a top view of a solar array being lifted in accordance with an embodiment of the inventive concepts.
Figure 8:
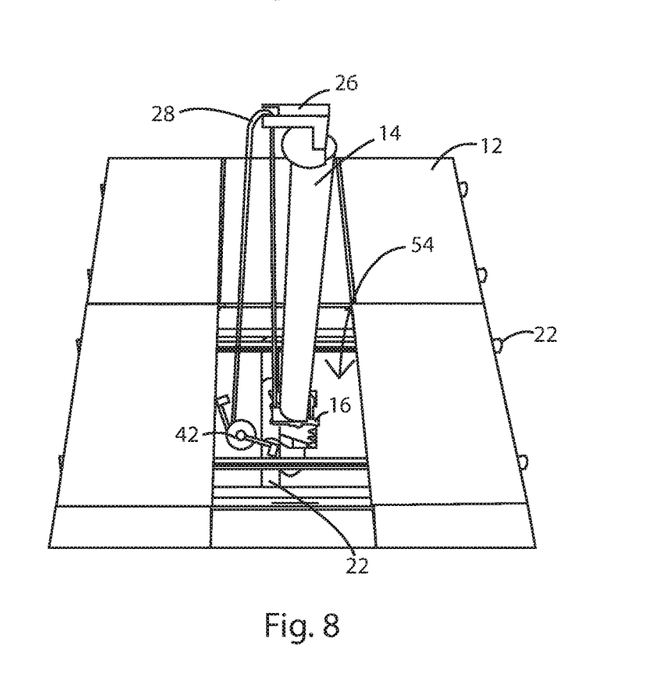
FIG. 8 is a top view of a solar array being lifted in accordance with an embodiment of the inventive concepts.
Figure 9:
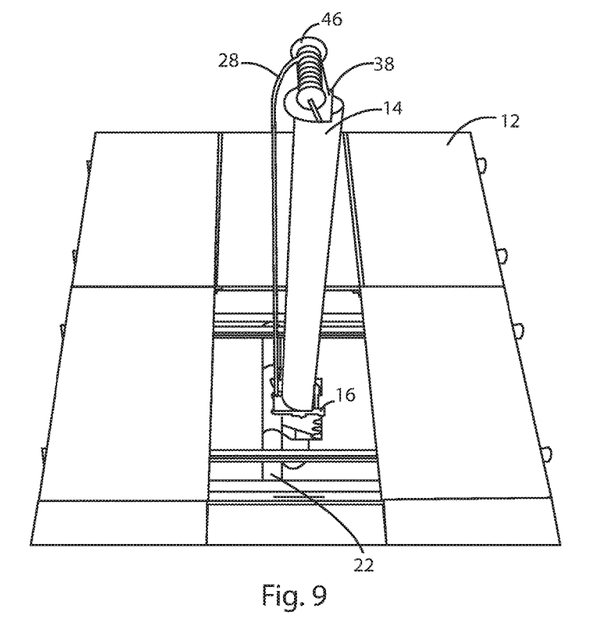
FIG. 9 is a top view of a solar array being lifted in accordance with an embodiment of the inventive concepts.

FIG. 6 shows a top view of the solar array lifting assembly 32 during the lifting of the solar array 24. Hand crank 42 is used in this example to apply tension to cable 28 which is routed around a pulley 36 at the end of lifting bracket 26 and is then attached to pole bracket 16. The tension force applied by the hand crank 42 must be sufficient to lift pole bracket 16 and the solar array. In place of hand crank 42 there can be other devices including an electric winch, or attachment to a vehicle or other pulling devices. FIG. 7 shows an alternate configuration where the hand crank is replaced with an electric winch 46 that is attached to the bottom of the support pole 14. FIG. 8 shows another possible configuration where the hand crank 42 has been attached to support pole 14 near the ground. Further, the electric winch with a remote control could be placed inside the lifting bracket 26 and lift the solar array directly with control from a remote control rather than requiring a pulley as in pulley 36, such as shown in FIG. 9.

Figure 10:
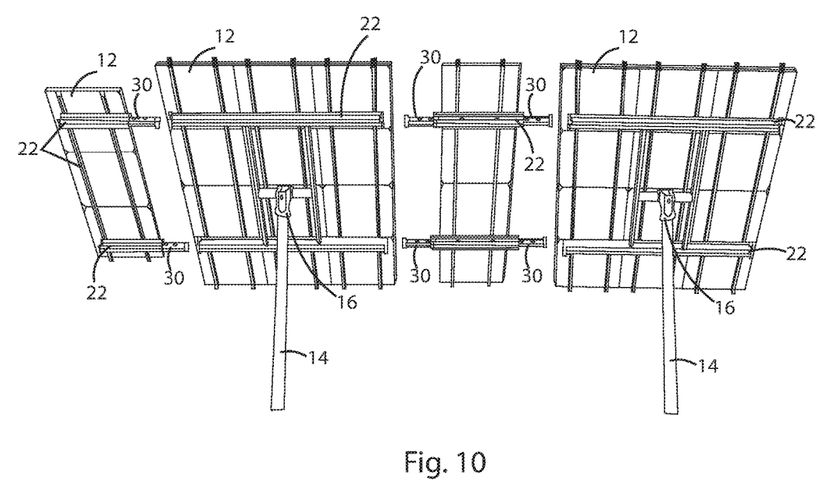
FIG. 10 is a bottom view of a solar array having frame extensions in accordance to an embodiment of the inventive concepts.

FIG. 10 is rear view of a lifted solar array where additional frame members 22 are added to support additional solar panels 12. In order to accomplish this frame extensions 30 are added to the already installed frame 22 so that frame extensions 30 extend beyond the already installed solar panels. Additional frame members 22 are then attached to the exposed section of frame extension 30 in order to facilitate attachment of additional solar panels. This allows for a more modular approach to solar panel installation where a user can add additional solar power capability without being required to do so at the time of initial installation.

Figure 11:
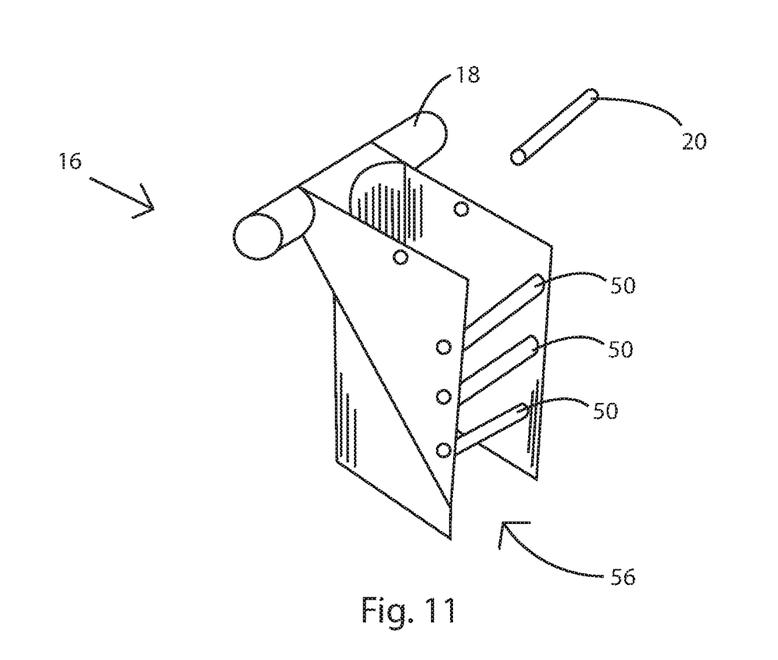
FIG. 11 is a perspective view of a pole bracket in accordance with an embodiment of the inventive concepts.

FIG. 11 shows a more detailed view of an embodiment of pole bracket 16. FIG. 11 shows pole bracket 16 having a frame attachment 18 capable of accepting a frame member and supporting the solar array. Prior to mounting on the support pole 14, pole bracket 16 has an open back. Once pole bracket 16 is placed on the support pole 14, fixed bolts 50 are placed across the open back 56. This configuration prevents pole bracket 16 from moving horizontally and coming off of the support pole. While any number of fixed bolts 50 is acceptable, the preferred embodiment shown utilizes 3 fixed bolts 50. These bolts would typically be ¾" bolts 10" long, steel bolts. Additionally, other mechanisms are acceptable such as a hingedly attached and lockable back plate, welding a back plate onto pole bracket 16, a pre-attached back plate placed over the support pole 14 from the top, and similar mechanisms that allow pole bracket 16 to slide up and down the support pole 14 while maintaining pole bracket 16 in a position surrounding the support pole 14. Pole bracket 16 further includes pole bracket securing mechanism 20 in order to secure pole bracket 16 at the top of support pole 14. While multiple devices are acceptable such as ratcheting roller mechanisms in pole bracket 16 or retractable pins located within the support pole, the preferred embodiment shown in FIG. 11 utilizes a bolt passing through pole bracket 16 and over the top of the support pole 14.

While certain exemplary embodiments are shown in the Figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims

I claim:

1. A method of lifting a solar array comprising the steps of:
   a. mounting a support pole in the ground, wherein said support pole is mounted in a vertical orientation, wherein said support pole is capable of supporting a solar array at a selected height above the ground;
   b. placing a lifting bracket on the top of the support pole, with said lifting bracket extending vertically and horizontally to a position outside of the diameter of said support pole, said lifting bracket having a bracket support for securing said lifting bracket in a selected position on said support pole, and a lifting mechanism for pulling said pole bracket up or down said support pole, with said lifting bracket providing access to a top edge of said support pole;
   c. assembling a pole bracket around said support pole at approximately ground level, wherein said pole bracket is configured to at least partially surround said support pole, with said pole bracket slideable on said vertical support pole, wherein said pole bracket is configured to support a frame to which solar panels are attached;
   d. attaching said lifting mechanism to said pole bracket;
   e. attaching a frame capable of supporting at least one solar panel to said pole bracket;
   f. attaching at least one solar panel to said frame for to form a solar array;
   g. applying force from said lifting mechanism to said pole bracket to cause said pole bracket with attached frame and solar panels to slide up said support pole toward said lifting bracket;
   h. continuing to apply upward force to the pole bracket until the solar array reaches a desirable height; and
   i. securing said pole bracket with attached solar array at the desired height with a pole bracket securing mechanism, said pole bracket securing mechanism comprising a removable bolt which is passable from side to side of pole bracket above a top edge of said support pole so that said pole bracket is prevented from lowering on said support pole by said removable bolt, with said lifting bracket removable after said removable bolt secures said pole bracket to said support pole.

2. The method of claim 1 wherein said lifting mechanism of step (d) comprises a chain fall hoist.

3. The method of claim 1 wherein said lifting mechanism of step (d) comprises a pulley.

4. The method of claim 1 wherein said lifting mechanism of step (i) comprises a winch mounted to the top of said pole and controlled by a remote control.

5. The method of claim 3 wherein said tension force is applied using a crank attached to the bottom of the pole.

* * * * *